US012592394B2

(12) United States Patent
Hasegawa et al.

(10) Patent No.: US 12,592,394 B2
(45) Date of Patent: Mar. 31, 2026

(54) MESOPOROUS CARBON, ELECTRODE CATALYST FOR FUEL CELL, AND CATALYST LAYER

(71) Applicants: TOYOTA JIDOSHA KABUSHIKI KAISHA, Toyota (JP); CATALER CORPORATION, Kakegawa (JP)

(72) Inventors: Naoki Hasegawa, Nagakute (JP); Kazuhisa Yano, Nagakute (JP); Tomohiro Takeshita, Nagakute (JP); Rui Imoto, Fujisawa (JP); Kumiko Nomura, Okazaki (JP); Yunan Wang, Machida (JP); Yuko Matsumura, Iwata (JP); Yuuki Kasama, Yokkaichi (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 519 days.

(21) Appl. No.: 18/182,472

(22) Filed: Mar. 13, 2023

(65) Prior Publication Data

US 2023/0299308 A1 Sep. 21, 2023

(30) Foreign Application Priority Data

Mar. 17, 2022 (JP) ................................. 2022-043154

(51) Int. Cl.
*H01M 4/92* (2006.01)
*H01M 8/10* (2016.01)
*H01M 8/1039* (2016.01)

(52) U.S. Cl.
CPC ......... *H01M 4/926* (2013.01); *H01M 8/1039* (2013.01); *H01M 2008/1095* (2013.01); *H01M 2300/0082* (2013.01)

(58) Field of Classification Search
CPC ........ B01J 21/18; B01J 35/643; B01J 35/647; B01J 35/33; H01M 4/926; H01M 8/1039; H01M 2008/1095; H01M 2300/0082; C01B 32/15; C01P 2004/04; C01P 2004/62; C01P 2004/64
(Continued)

(56) References Cited

U.S. PATENT DOCUMENTS

2006/0099476 A1 5/2006 Watakabe et al.
2007/0270305 A1* 11/2007 Pak ..................... H01M 4/8657
502/172
(Continued)

FOREIGN PATENT DOCUMENTS

JP 2003036856 A 2/2003
JP 2006152249 A 6/2006
(Continued)

*Primary Examiner* — Patricia L. Hailey
(74) *Attorney, Agent, or Firm* — Dickinson Wright, PLLC

(57) ABSTRACT

Mesoporous carbon includes a linked structure in which carbon particles are linked. The carbon particles have primary pores and are primary particles. An average entrance diameter of the primary pores is 2.0 nm or more and 3.0 nm or less. An average constriction diameter of the primary pores is 1.6 nm or more and 2.4 nm or less. An electrode catalyst for a fuel cell includes the mesoporous carbon and catalyst particles supported in the primary pores of the mesoporous carbon. A catalyst layer includes the electrode catalyst for a fuel cell and a catalyst layer ionomer.

4 Claims, 3 Drawing Sheets

CONSTRICTION
DIAMETER: 2.2 nm

(58) Field of Classification Search
USPC ....... 429/482; 423/445 R; 502/101, 182, 185
See application file for complete search history.

(56)                              References Cited

U.S. PATENT DOCUMENTS

| 2018/0123154 | A1  |   | 5/2018  | Furukawa et al. |            |
|--------------|-----|---|---------|-----------------|------------|
| 2018/0301726 | A1  | * | 10/2018 | Shintani        | H01M 4/926 |
| 2020/0287221 | A1  |   | 9/2020  | Iijima et al.   |            |
| 2021/0163292 | A1  |   | 6/2021  | Hasegawa et al. |            |
| 2022/0328847 | A1  | * | 10/2022 | Tanuma          | B01J 35/613 |
| 2023/0085417 | A1  |   | 3/2023  | Miyao et al.    |            |
| 2023/0343971 | A1  | * | 10/2023 | Wang            | C01B 32/05 |

FOREIGN PATENT DOCUMENTS

| JP | 2013216811    | A |   | 10/2013 |            |
|----|---------------|---|---|---------|------------|
| JP | 2018174078    | A |   | 11/2018 |            |
| KR | 20050116171   | A | * | 12/2005 | C01B 31/02 |
| KR | 1020210067902 | A |   | 6/2021  |            |
| WO | 2012/088166   | A1 |  | 6/2012  |            |
| WO | 2016/152447   | A1 |  | 9/2016  |            |
| WO | 2019/004472   | A1 |  | 1/2019  |            |
| WO | 2021161929    | A1 |  | 8/2021  |            |

* cited by examiner

CONSTRICTION
DIAMETER: 2.2 nm

CONSTRICTION
DIAMETER: 2.5 nm

MESOPOROUS CARBON, ELECTRODE CATALYST FOR FUEL CELL, AND CATALYST LAYER

CROSS-REFERENCE TO RELATED APPLICATION

This application claims priority to Japanese Patent Application No. 2022-043154 filed on Mar. 17, 2022, incorporated herein by reference in its entirety.

BACKGROUND

1. Technical Field

The present disclosure relates to mesoporous carbon, electrode catalysts for fuel cells, and catalyst layers.

2. Description of Related Art

A polymer electrolyte fuel cell includes a membrane electrode assembly (MEA) in which electrodes containing a catalyst (catalyst layers) are bonded to both surfaces of an electrolyte membrane. Gas diffusion layers are usually disposed outside the catalyst layers. In addition, current collectors (separators) with gas flow channels are disposed outside the gas diffusion layers. The polymer electrolyte fuel cell usually has a structure in which a plurality of single cells, each composed of the MEA, the gas diffusion layers, and the current collectors, is stacked (fuel cell stack).

In the polymer electrolyte fuel cell, the catalyst layer is typically made of a mixture of a catalyst layer ionomer and an electrode catalyst in which catalyst metal fine particles such as platinum are supported on a support surface. A carbon material such as carbon black or acetylene black is usually used as a catalyst support. It is known that the pore size, specific surface area, etc. of the carbon material used as a catalyst support affect the characteristics of the fuel cell. Therefore, various proposals have been made regarding carbon materials with controlled pore sizes, specific surface areas, etc.

For example, WO 2016/152447 discloses a method for producing a support carbon material. In this method, (a) a mixture of gamma-alumina particles and polyvinyl alcohol is baked in an inert gas atmosphere to obtain an alumina-carbon composite, (b) alumina in the alumina-carbon composite is dissolved and removed by sodium hydroxide to obtain a carbon material, and (c) the obtained carbon material is pulverized and the pulverized carbon material is activated.

WO 2016/152447 describes the following (A) to (D). (A) Mesopores having a radius of 2 nm or more and 5 nm or less (catalyst support pores) and mesopores having a radius of 5 nm or more and 25 nm or less and communicating with the catalyst support pores (gas diffusion pores) are present in the support carbon material obtained as described above. (B) When such a support carbon material supports catalyst metal fine particles with a radius of 1 nm to 3 nm, the catalyst metal fine particles are supported within the catalyst support pores. (C) When the support carbon material with the catalyst metal fine particles supported within the catalyst support pores is used as an air electrode catalyst for a fuel cell, water molecules produced on the catalyst metal fine particles diffuse from the catalyst support pores through the gas diffusion pores to outside the support carbon material.

(D) Such diffusion of the water molecules to outside the support carbon material can reduce flooding inside the support carbon material.

A carbon support material with a low voltage drop under high temperature and low humidity conditions and an electrode catalyst using this carbon support material are required in order to allow higher temperature operation of the polymer electrolyte fuel cell. The high temperature and low humidity conditions are the conditions under which the polymer electrolyte fuel cell is subjected to a high thermal load. Hereinafter, the power generation performance under the high temperature and low humidity conditions is sometimes referred to as "high temperature and low humidity performance." It is desired to improve the high temperature and low humidity performance of the carbon support.

For example, WO 2016/152447 describes that the use of the support carbon material having catalyst support pores with a radius of 2 nm to 5 nm and gas diffusion pores with a radius of 5 nm to 25 nm can reduce flooding inside the support carbon material. However, WO 2016/152447 only defines the range of pore size and the range of pore volume on the assumption that the porous carbon material has a uniform pore structure. Moreover, the support carbon material described in WO 2016/152447 does not have a pore structure capable of retaining water necessary for proton conduction in the pores under the high temperature and low humidity conditions. The support carbon material described in WO 2016/152447 is therefore considered not to have enough high temperature and low humidity performance.

SUMMARY

The present disclosure provides mesoporous carbon that exhibits high water retention under high temperature and low humidity conditions. The present disclosure also provides an electrode catalyst for a fuel cell that uses such mesoporous carbon as a catalyst support. The present disclosure also provides a catalyst layer including such an electrode catalyst for a fuel cell.

Mesoporous carbon according to an aspect of the present disclosure includes a linked structure in which carbon particles are linked. The carbon particles have primary pores and are primary particles. An average entrance diameter of the primary pores is 2.0 nm or more and 3.0 nm or less. An average constriction diameter of the primary pores is 1.6 nm or more and 2.4 nm or less. The average entrance diameter is an average of circle equivalent diameters at entrances of the primary pores that are open to surfaces of the carbon particles, as measured by three-dimensional transmission electron microscope image analysis. The average constriction diameter is an average of circle equivalent diameters of constrictions of the primary pores inside the carbon particles, as measured by the three-dimensional transmission electron microscope image analysis.

In the mesoporous carbon, a high temperature and low humidity voltage may be 570 mV or higher.

In the mesoporous carbon, an average particle size of the carbon particles may be 30 nm or more and 300 nm or less.

An electrode catalyst for a fuel cell according to an aspect of the present disclosure includes the mesoporous carbon according to the present disclosure, and catalyst particles supported in the primary pores of the mesoporous carbon.

A catalyst layer according to an aspect of the present disclosure includes the electrode catalyst according to the present disclosure, and a catalyst layer ionomer.

When the mesoporous carbon in which the average entrance diameter and the average constriction diameter of the primary pores are within the predetermined ranges is used as a catalyst support for a fuel cell, water generated during power generation under high temperature and low humidity conditions can be effectively retained in the primary pores. Since protons are transported to the surfaces of the catalyst particles by the generated water retained in the primary pores, the catalyst particles in the primary pores can be effectively used. As a result, the high temperature and low humidity performance of the fuel cell is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1A:
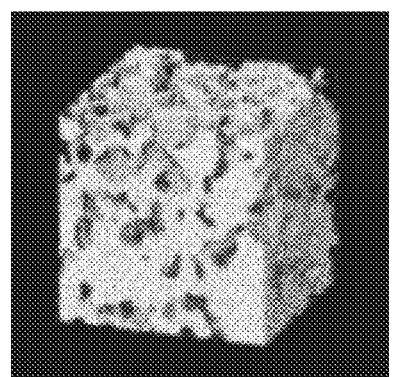
FIG. 1A is a three-dimensional image of mesoporous carbon obtained in Example 1.

Hereinafter, an embodiment of the present disclosure will be described in detail.
1. Mesoporous Carbon
Mesoporous carbon according to the present disclosure includes a linked structure in which carbon particles (primary particles) having primary pores are linked. The average entrance diameter of the primary pores is 2.0 nm or more and 3.0 nm or less. The average constriction diameter of the primary pores is 1.6 nm or more and 2.4 nm or less.
1.1. Linked Structure
As will be described below, the mesoporous carbon according to the present disclosure is produced using mesoporous silica as a template. Mesoporous silica is usually synthesized by polycondensing a silica source in a reaction solution containing the silica source, a surfactant, and a catalyst. At this time, at least one of the following is optimized: the type of solvent, the concentration of the surfactant in the reaction solution, and the concentration of the silica source in the reaction solution. Mesoporous silica is thus obtained that includes a linked structure and whose pore size (average entrance diameter, average constriction diameter, average pore diameter) and pore volume are within specific ranges. Mesoporous carbon that has a linked structure and whose pore size and pore volume are within specific ranges is obtained by using such mesoporous silica as a template.
As used herein, the "linked structure" refers to the structure in which primary particles that are carbon particles are linked together like beads on a string. Each of the primary particles forming the linked structure have primary pores inside. The primary pores inside each primary particle are cavities that remain after removing the pore walls of the mesoporous silica used as a template. The shape of the primary particles is usually not a perfect sphere, but is distorted with an aspect ratio of about 1.1 to 3. The size of the primary pores inside the mesoporous carbon is usually not uniform, and varies depending on the location. The size at the entrance of the primary pore is typically different from the size inside the primary pore. The size inside the primary pore is also not uniform, and the primary pore usually has smaller voids (constrictions) than their adjacent voids.
1.2. Primary Particles
Primary particles are carbon particles having primary pores. Since the mesoporous carbon according to the present disclosure is produced by a method that will be described later, primary particles forming the mesoporous carbon have the following characteristics.
1.2.1. Average Entrance Diameter
The "average entrance diameter" refers to the average of the circle equivalent diameters at the entrances of the primary pores that are open to the surfaces of the carbon particles, as measured by three-dimensional transmission electron microscope image analysis. In order to reduce the measurement error, it is preferable to calculate the circle equivalent diameters at 500 or more entrances. By using a three-dimensional transmission electron microscope (3DTEM), a two-dimensional projection image of a sample is successively captured while tilting the sample at predetermined angular intervals. A three-dimensional image (stereoscopic image) of the sample can be reconstructed by mathematically processing the obtained two-dimensional projection images. The diameter at the entrance of each primary pore can be measured from the obtained three-dimensional image.
The average entrance diameter affects the high temperature and low humidity performance of an electrode catalyst using the mesoporous carbon as a support. When the average entrance diameter is too small, it may be difficult to support catalyst particles in the primary pores. Therefore, the average entrance diameter needs to be 2.0 nm or more.
On the other hand, when the average entrance diameter is too large, the high temperature and low humidity performance may decrease. This is considered to be because, when the average entrance diameter is too large, water retained in the primary pores tends to be discharged to the outside under the high temperature and low humidity conditions. Therefore, the average entrance diameter needs to be 3.0 nm or less. The average entrance diameter is preferably 2.8 nm or less.
1.2.2. Average Constriction Diameter
The "average constriction diameter" refers to the average of the circle equivalent diameters of the constrictions of the primary pores inside the carbon particles, as measured by the three-dimensional transmission electron microscope image analysis. In order to reduce the measurement error, it is preferable to calculate the circle equivalent diameters of 500 or more constrictions. As described above, a three-dimensional image (stereoscopic image) of the sample is obtained by using a three-dimensional transmission electron microscope. The diameters of the constrictions of each primary pore can be measured from the obtained three-dimensional image.
The average constriction diameter affects the high temperature and low humidity performance of an electrode catalyst using the mesoporous carbon as a support. When the average constriction diameter is too small, it may be difficult to support catalyst particles in the primary pores. Therefore, the average constriction diameter needs to be 1.6 nm or more.

On the other hand, when the average constriction diameter is too large, the high temperature and low humidity performance may decrease. This is considered to be because, when the average constriction diameter is too large, water retained in the primary pores tends to be discharged to the outside under the high temperature and low humidity conditions. Therefore, the average constriction diameter needs to be 2.4 nm or less. The average constriction diameter is preferably 2.3 nm or less.

1.2.3. Average Pore Diameter

The "average pore diameter" refers to the average of the diameters of the primary pores included in the primary particles, and does not include the size of the voids between the primary particles (secondary pores). The average pore diameter is obtained by analyzing adsorption data of a nitrogen adsorption isotherm of the mesoporous carbon by the Barrett-Joyner-Halenda (BJH) method and obtaining the pore size when the pore volume is maximized (most frequent peak value).

Typically, when the average pore diameter is too small, a reactive gas and protons may be less likely to be supplied to the catalyst particles supported in the primary pores. Moreover, when power is generated in a high current density region, water generated by the reaction may be less likely to be discharged. Therefore, the average pore diameter is preferably 2 nm or more. The average pore diameter is more preferably 2.5 nm or more. On the other hand, when the average pore diameter is too large, an ionomer tends to enter the primary pores. As a result, the catalyst particles are poisoned by the ionomer, and their activity is reduced. Therefore, the average pore diameter is preferably less than 20 nm. The average pore diameter is more preferably 10 nm or less, even more preferably 7 nm or less, still even more preferably 5 nm or less.

1.2.4. Average Thickness of Pore Walls

The "average thickness of the pore walls" refers to the average of the thicknesses of the pore walls of the primary pores included in the primary particles. The average thickness of the pore walls is obtained by measuring the thicknesses of 100 or more randomly selected pore walls using a microscope and calculating the average of the measured thicknesses.

When the average thickness of the pore walls is too small, carbon tends to be oxidized, and the durability may be reduced. Therefore, the average thickness of the pore wall is preferably 3 nm or more. The average thickness is more preferably 3.5 nm or more, even more preferably 4 nm or more. On the other hand, when the average thickness of the pore walls is too large, the pore volume of the primary particles decreases, and the catalyst particles may be less likely to be supported. Therefore, the average thickness of the pore walls is preferably 15 nm or less. The average thickness is more preferably 12 nm or less, even more preferably 10 nm or less.

1.2.5. Pore Volume of Primary Pores

The "pore volume of the primary pores" refers to the volume of the primary pores included in the primary particles, and does not include the volume of the voids between the primary particles (secondary pores). The pore volume of the primary pores is obtained by analyzing the adsorption data of the nitrogen adsorption isotherm of the mesoporous carbon by the BJH method and calculating the value of $P/P_0 = 0.03$ to 0.99.

Typically, when the pore volume of the primary pores is too small, the catalyst particles are less likely to be supported in the primary pores. Therefore, the pore volume of the primary pores is preferably 0.2 mL/g or more. The pore volume of the primary pores is more preferably 0.5 mL/g or more, and even more preferably 1.0 mL/g or more. On the other hand, when the pore volume of the primary pores is too large, the proportion of the volume of the pore walls in the volume of the primary particle is reduced, and the electronic conduction properties may decrease. In addition, the amount of ionomer entering the primary pores increases, and the activity may be reduced by catalyst poisoning. Therefore, the pore volume of the primary pores is preferably 3.0 mL/g or less. The pore volume of the primary pores is more preferably 2.5 mL/g or less, and even more preferably 2.0 mL/g or less.

1.2.6. Average Particle Size of Primary Particles

The "average particle size of the primary particles" refers to the average of the lengths in the minor axis direction of the primary particles. The "length in the minor axis direction" refers to the length in the direction perpendicular to the direction in which the length of the primary particle is the largest (major axis direction). The average particle size of the primary particles is obtained by measuring the lengths in the minor axis direction of 100 or more randomly selected primary particles using a microscope and calculating the average of the measured lengths.

Typically, when the average particle size of the primary particles is too small, the catalyst particles are less likely to be supported in the primary pores. Therefore, the average particle size of the primary particles is preferably 30 nm or more. The average particle size is more preferably 40 nm or more, even more preferably 50 nm or more.

Typically, when the average particle size of the primary particles is too large, a reactive gas and protons may be less likely to be supplied to the catalyst particles supported in the primary pores. Moreover, when power is generated in a high current density region, water generated by the reaction may be less likely to be discharged. Therefore, the average particle size is preferably 300 nm or less. The average particle size is more preferably 250 nm or less, even more preferably 150 nm or less.

1.3. High Temperature and Low Humidity Voltage

The "high temperature and low humidity voltage" refers to the voltage measured using the following polymer electrolyte fuel cell (a) under the following conditions (b): (a) a polymer electrolyte fuel cell including an air electrode catalyst layer in which 40 mass % of Pt is supported on an electrode catalyst, the basis weight of Pt is 0.1 mg/cm², and the ionomer-to-carbon ratio (I/C) is 1.0, and (b) cell temperature: 105° C., relative humidity: 30%, and current density: 3.2 A/cm².

Since the average entrance diameter and the average constriction diameter of the mesoporous carbon according to the present disclosure are within the predetermined ranges, the mesoporous carbon according to the present disclosure exhibits high water retention even under the high temperature and low humidity conditions. When the average entrance diameter and the average constriction diameter are optimized, the high temperature and low humidity voltage is 570 mV or more. When the pore structure is further optimized, the high temperature and low humidity voltage is 590 mV or more.

1.4. Degree of Graphitization

Mesoporous carbon is obtained by filling the mesopores of mesoporous silica with a carbon source and carbonizing the carbon source. In order to reduce the reaction between mesoporous silica and carbon, it is necessary to make the carbonization temperature of the carbon source relatively low. Therefore, the mesoporous carbon after carbonizing the carbon source tends to have a turbostratic structure. The mesoporous carbon with a turbostratic structure has lower electronic conduction properties than mesoporous carbon with a graphite structure.

When the mesoporous carbon with a turbostratic structure is graphitized at a temperature higher than 1500° C., the mesoporous carbon with a turbostratic structure gradually changes to mesoporous carbon with a graphite structure. Typically, the higher the graphitization temperature, the higher the degree of graphitization.

2. Electrode Catalyst for Fuel Cell

The electrode catalyst for a fuel cell according to the present disclosure includes the mesoporous carbon according to the present disclosure and catalyst particles supported in the primary pores of the mesoporous carbon.

2.1. Mesoporous Carbon

In the electrode catalyst for a fuel cell according to the present disclosure, the mesoporous carbon is a catalyst support that supports catalyst particles. The catalyst particles are mainly supported in the primary pores of the primary particles forming the mesoporous carbon. Since the details of the mesoporous carbon are as described above, description thereof will be omitted.

2.2. Catalyst Particles

In the present disclosure, the material of the catalyst particles is not particularly limited as long as it is a material exhibiting oxygen reduction reaction activity or hydrogen oxidation reaction activity. Examples of the material of the catalyst particles include: (a) noble metals (platinum (Pt), gold (Au), silver (Ag), palladium (Pd), rhodium (Rh), iridium (Ir), ruthenium (Ru), and osmium (Os)); (b) alloys containing two or more noble metal elements; (c) alloys containing one or more noble metal elements and one or more base metal elements (e.g., iron (Fe), cobalt (Co), nickel (Ni), chromium (Cr), vanadium (V), and titanium (Ti)); (d) metal oxynitrides; and (e) carbon alloys.

3. Catalyst Layer

The catalyst layer according to the present disclosure contains the electrode catalyst for a fuel cell according to the present disclosure and a catalyst layer ionomer. The catalyst layer according to the present disclosure is particularly suitable as a catalyst layer for an air electrode, but may be used as a catalyst layer for a fuel electrode.

3.1. Electrode Catalyst for Fuel Cell

The catalyst layer according to the present disclosure includes the electrode catalyst for a fuel cell according to the present disclosure. Since the details of the electrode catalyst for a fuel cell are as described above, description thereof will be omitted.

3.2. Catalyst Layer Ionomer

In the catalyst layer according to the present disclosure, the material of the catalyst layer ionomer is not particularly limited. Examples of the catalyst layer ionomer include perfluorocarbon sulfonic acid polymers and high oxygen permeable ionomers. One of these ionomers may be used alone, or two or more of these ionomers may be used in combination.

The "perfluorocarbon sulfonic acid polymer" refers to a fluorine-containing ion exchange resin containing repeat units based on a sulfonyl fluoride vinyl ether monomer. Examples of the perfluorocarbon sulfonic acid polymers include Nafion (registered trademark), Flemion (registered trademark), Aquivion (registered trademark), and Aciplex (registered trademark).

The "high oxygen permeable ionomer" refers to a polymer compound including an acid group and a cyclic structure in its molecular structure. The high oxygen permeable ionomers have a high oxygen permeability coefficient because they include a cyclic structure in their molecular structures. Therefore, when a high oxygen permeable ionomer is used as an ionomer, the oxygen transfer resistance at the interface with the catalyst is relatively low. In other words, the "high oxygen permeable ionomer" refers to an ionomer having a higher oxygen permeability coefficient than the perfluorocarbon sulfonic acid polymers represented by Nafion (registered trademark).

Examples of the high oxygen permeable ionomers include: (a) electrolyte polymers containing a perfluorocarbon unit having an aliphatic ring structure and an acid group unit having a perfluorosulfonic acid in a side chain; (b) electrolyte polymers containing a perfluorocarbon unit having an aliphatic ring structure and an acid group unit having a perfluoroimide in a side chain; (c) electrolyte polymers containing a unit with a perfluorosulfonic acid bonded directly to a perfluorocarbon having an aliphatic ring structure (see Reference Documents 1 to 4). [Reference Document 1] Japanese Unexamined Patent Application Publication No. 2003-036856 (JP 2003-036856 A), [Reference Document 2] WO 2012/088166, [Reference Document 3] Japanese Unexamined Patent Application Publication No. 2013-216811 (JP 2013-216811 A), and [Reference Document 4] Japanese Unexamined Patent Application Publication No. 2006-152249 (JP 2006-152249 A)

4. Method for Producing Mesoporous Silica (Template)

The mesoporous carbon according to the present disclosure is produced using mesoporous silica as a template. A method for producing mesoporous silica according to the present disclosure includes: a polymerization step of polycondensing a silica source in a reaction solution containing the silica source, a surfactant, and a catalyst to obtain precursor particles; a drying step of separating the precursor particles from the reaction solution and drying the precursor particles; and a baking step of baking the precursor particles to obtain mesoporous silica. The method for producing mesoporous silica according to the present disclosure may further include a diameter increasing step of performing a diameter increasing treatment on the dried precursor particles.

4.1. Polymerization Step

First, a silica source is polycondensed in a reaction solution containing the silica source, a surfactant, and a catalyst to obtain precursor particles (polymerization step).

4.1.1. Silica Source

In the present disclosure, the type of silica source is not particularly limited. Examples of the silica source include: (a) tetraalkoxysilanes such as tetramethoxysilane, tetraethoxysilane, tetraisopropoxysilane, tetrabutoxysilane, dimethoxydiethoxysilane, and tetraethyleneglycoxysilane; (b) trialkoxysilanes such as 3-mercaptopropyltrimethoxysilane, 3-aminopropyltrimethoxysilane, 3-aminopropyltriethoxysilane, 3-(2-aminoethyl)aminopropyltrimethoxysilane; and (c) silicates such as sodium silicate and kanemite. One of these silica sources may be used alone, or two or more of these silica sources may be used in combination.

4.1.2. Surfactant

When a surfactant is contained in the reaction solution, the surfactant forms micelles in the reaction solution during polycondensation of the silica source in the reaction solution. Since hydrophilic groups gather around the micelles, the silica source is adsorbed on the surfaces of the micelles. In addition, the micelles adsorbed by the silica source self-assemble in the reaction solution, and the silica source is polycondensed. As a result, mesopores due to the micelles are formed inside the primary particles. The mesopores include micropores with a diameter of 2 nm or less. The same applies to the following description. The size of the mesopores can be controlled (from 1 nm to 50 nm) mainly by the molecular length of the surfactant.

In the present disclosure, the type of surfactant is not particularly limited. However, it is preferable to use an alkyl quaternary ammonium salt. The alkyl quaternary ammonium salt refers to a compound represented by the following formula (a). $CH_3—(CH_2)_n—N^+(R_1)(R_2)(R_3)X^-$ (a)

In the formula (a), $R_1$, $R_2$, and $R_3$ each represent an alkyl group having one to three carbon atoms. $R_1$, $R_2$, and $R_3$ may be the same as or different from each other. In order to facilitate aggregation of alkyl quaternary ammonium salts (formation of micelles), it is preferable that all of $R_1$, $R_2$, and $R_3$ be the same. At least one of $R_1$, $R_2$, and $R_3$ is preferably a methyl group, and all of them are preferably methyl groups. In the formula (a), X represents a halogen atom. The type of halogen atom is not particularly limited, but X is preferably chlorine (Cl) or bromine (Br) from the standpoint of accessibility.

In the formula (a), n represents an integer of 7 to 21. Typically, as n becomes smaller, a spherical mesoporous material having a smaller median pore size of mesopores is obtained. On the other hand, as n becomes larger, the median pore size becomes larger. However, when n is too large, the hydrophobic interaction of the alkyl quaternary ammonium salts becomes excessive. As a result, a layered compound is produced, and a mesoporous material cannot be obtained. In the formula (a), n is preferably 9 to 17, more preferably 13 to 17.

Of the compounds represented by the formula (a), alkyltrimethylammonium halides are preferable. Examples of the alkyltrimethylammonium halides include hexadecyltrimethylammonium halides, octadecyltrimethylammonium halides, nonyltrimethylammonium halides, decyltrimethylammonium halides, undecyltrimethylammonium halides, dodecyltrimethylammonium halides, and tetradecylammonium halides. Among these, alkyltrimethylammonium bromides or alkyltrimethylammonium chlorides are particularly preferable.

When synthesizing mesoporous silica, one type of alkyl quaternary ammonium salt may be used, or two or more types of alkyl quaternary ammonium salts may be used. However, since the alkyl quaternary ammonium salt serves as a template for forming mesopores in the primary particles, the type of alkyl quaternary ammonium salt greatly affects the shape of the mesopores. In order to synthesize silica particles with more uniform mesopores, it is preferable to use one type of alkyl quaternary ammonium salt.

4.1.3. Catalyst

When polycondensing the silica source, a catalyst is usually added to the reaction solution. When synthesizing mesoporous silica in the form of particles, an alkali such as sodium hydroxide or ammonia water may be used as the catalyst, or an acid such as hydrochloric acid may be used as the catalyst.

4.1.4. Solvent

For example, an organic solvent such as water or alcohol or a mixed solvent of water and an organic solvent is used as a solvent. The alcohol may be any of the following: (1) a monohydric alcohol such as methanol, ethanol, or propanol, (2) a divalent alcohol such as ethylene glycol, and (3) a trivalent alcohol such as glycerin.

When a mixed solvent of water and an organic solvent is used, the content of the organic solvent in the mixed solvent can be selected as desired depending on the intended purpose. Typically, adding an appropriate amount of organic solvent to a solvent facilitates control of particle size and particle size distribution. In addition, in the case of using a mixed solvent of water and an organic solvent, mesoporous silica for producing mesoporous carbon with high flooding resistance can be produced at low cost by using a mixed solvent containing 5 mass % or less of an organic solvent.

4.1.5. Composition of Reaction Solution

The composition of the reaction solution affects the outer shape and pore structure of the mesoporous silica to be synthesized. In particular, the concentration of the surfactant in the reaction solution and the concentration of the silica source in the reaction solution greatly affect the average particle size, pore size, and pore volume of primary particles that are mesoporous silica particles.

A. Concentration of Surfactant

When the concentration of the surfactant is too low, the precipitation rate of the particles becomes low, and a structure in which the primary particles are linked cannot be obtained. Therefore, the concentration of the surfactant needs to be 0.03 mol/L or more. The concentration of the surfactant is preferably 0.035 mol/L or more, more preferably 0.04 mol/L or more.

On the other hand, when the concentration of the surfactant is too high, the precipitation rate of the particles becomes too high, and the primary particle size easily exceeds 300 nm. Therefore, the concentration of the surfactant needs to be 1.0 mol/L or less. The concentration of the surfactant is preferably 0.95 mol/L or less, more preferably 0.90 mol/L or less.

B. Concentration of Silica Source

When the concentration of the silica source is too low, the precipitation rate of the particles becomes low, and a structure in which the primary particles are linked cannot be obtained. Alternatively, the surfactant may become excessive, and uniform mesopores may not be obtained. Therefore, the concentration of the silica source needs to be 0.05 mol/L or more. The concentration of the silica source is preferably 0.06 mol/L or more, more preferably 0.07 mol/L or more.

On the other hand, when the concentration of the silica source is too high, the precipitation rate of the particles becomes too high, and the primary particle size easily exceeds 300 nm. Alternatively, particles in the form of a sheet may be produced instead of spherical particles. Therefore, the concentration of the silica source needs to be 1.0 mol/L or less. The concentration of the silica source is preferably 0.95 mol/L or less, more preferably 0.9 mol/L or less.

C. Concentration of Catalyst

In the present disclosure, the concentration of the catalyst is not particularly limited. Typically, when the concentration of the catalyst is too low, the precipitation rate of the particles becomes low. On the other hand, when the concentration of the catalyst is too high, the precipitation rate of the particles becomes high. The optimum concentration of the catalyst is preferably selected according to the type of silica source, the type of surfactant, the target physical property values, etc. For example, when an acid is used as a catalyst, it is preferable to adjust the concentration of the catalyst so that the pH of the reaction solution is 9 or less. The pH of the reaction solution is more preferably 8.5 or less, even more preferably less than 5. On the other hand, when an alkali is used as a catalyst, it is preferable to adjust the concentration of the catalyst so that the pH of the reaction solution is higher than 7.

4.1.6. Reaction Conditions

A silica source is added to a solvent containing a predetermined amount of a surfactant, and hydrolysis and polycondensation are performed. As a result, the surfactant functions as a template, and precursor particles containing silica and the surfactant are obtained. The optimum reaction conditions are selected according to the type of silica source, the particle size of the precursor particles, etc. Typically, the reaction temperature is preferably –20° C. to 100° C. The reaction temperature is more preferably 0° C. to 100° C., even more preferably 0° C. to 90° C., still even more preferably 10° C. to 80° C., still even more preferably 35° C. to 80° C.

4.2. Drying Step

Thereafter, the precursor particles are separated from the reaction solution and dried (drying step). Drying is performed to remove the solvent remaining in the precursor particles. The drying conditions are not particularly limited as long as the solvent can be removed.

4.3. Diameter Increasing Treatment

Subsequently, the dried precursor particles may be subjected to a diameter increasing treatment (diameter increasing step), as necessary. The "diameter increasing treatment" refers to a treatment for increasing the diameter of the mesopores in the primary particles. Specifically, the diameter increasing treatment is performed by hydrothermally treating the synthesized precursor particles (in which the surfactant has not been removed) in a solution containing a diameter increasing agent. The pore size of the precursor particles can be increased by this treatment.

Examples of the diameter increasing agent include: (a) hydrocarbons such as trimethylbenzene, triethylbenzene, benzene, cyclohexane, triisopropylbenzene, naphthalene, hexane, heptane, octane, nonane, decane, undecane, and dodecane; and (b) acids such as hydrochloric acid, sulfuric acid, and nitric acid.

The reason why the pore size is increased by performing a hydrothermal treatment in the presence of hydrocarbon is considered to be that rearrangement of silica occurs when the diameter increasing agent is introduced from the solvent into the pores of the more hydrophobic precursor particles. The reason why the pore size is increased by performing a hydrothermal treatment in the presence of an acid such as hydrochloric acid is considered to be that dissolution and reprecipitation of silica proceed inside the primary particles. When the production conditions are optimized, pores are formed in a radical pattern inside the silica. When a hydrothermal treatment is then performed in the presence of an acid, dissolution and reprecipitation of silica occurs, and the pores in the radial pattern are converted to communicating pores.

The conditions for the diameter increasing treatment are not particularly limited as long as the desired pore size can be obtained. It is usually preferable to add about 0.05 mol/L to 10 mol/L of the diameter increasing agent to the reaction solution and perform a hydrothermal treatment at 50° C. to 150° C.

4.4. Baking Step

After the diameter increasing treatment is performed as necessary, the precursor particles are baked (baking step). As a result, the mesoporous silica according to the present disclosure is obtained. The baking is performed to dehydrate and polymerize the precursor particles in which OH groups remain and to thermally decompose the surfactant remaining in the mesopores. The baking conditions are not particularly limited as long as dehydration and crystallization of the precursor particles and thermal decomposition of the surfactant are possible. The baking is usually performed in air by heating at 400° C. to 800° C. for one hour to 10 hours.

5. Method for Producing Mesoporous Carbon

A method for producing mesoporous carbon according to the present disclosure includes: a first step of preparing mesoporous silica that will serve as a template; a second step of depositing carbon in the mesopores of the mesoporous silica to prepare a mesoporous silica-carbon composite; and a third step of removing the mesoporous silica from the composite. The method for producing mesoporous carbon may further include a fourth step of heat treating the mesoporous carbon at a temperature higher than 1500° C. after the third step.

5.1. First Step (Preparation of Template)

First, mesoporous silica that will serve as a template is prepared (first step). Since the details of the method for producing mesoporous silica are as described above, description thereof will be omitted.

5.2. Second Step (Carbon Deposition in Mesopores)

Next, carbon is deposited in the mesopores of the mesoporous silica to prepare a mesoporous silica-carbon composite (second step). Deposition of carbon in the mesopores is specifically performed by (a) introducing a carbon precursor into the mesopores, and (b) polymerizing and carbonizing the carbon precursor in the mesopores.

5.2.1. Introduction of Carbon Precursor

The "carbon precursor" refers to a precursor capable of producing carbon by thermal decomposition. Specific examples of the carbon precursor include: (1) polymer precursors that are liquid at room temperature and are thermally polymerizable (e.g., furfuryl alcohol and aniline); (2) mixtures of an aqueous solution of carbohydrate and an acid (e.g., mixtures of monosaccharides such as sucrose (cane sugar), xylose (wood sugar), glucose (dextrose), disaccharides, or polysaccharides, and acids such as sulfuric acid, hydrochloric acid, nitric acid, phosphoric acid); and (3) two-component curable polymer precursor mixtures (e.g., phenol and formalin). Among these, the mesopores can be impregnated with the polymer precursor without the need for dilution with a solvent. Therefore, a relatively large amount of carbon can be produced in the mesopores with a relatively small number of impregnations. The polymer precursor is also advantageous in that no polymerization initiator is required and handling is easy.

When a carbon precursor in the form of a liquid or solution is used, the more the amount of liquid or solution adsorbed per impregnation, the better, and the amount of carbon precursor is preferably large enough for the entire mesopores to be filled with the liquid or solution. When a mixture of an aqueous solution of carbohydrate and an acid is used as a carbon precursor, the amount of acid is preferably the minimum amount that can polymerize an organic substance. When a two-component curable polymer precursor mixture is used as a carbon precursor, the optimum ratio of the two-component curable polymer precursor mixture is selected according to the type of the polymer precursor.

5.2.2. Polymerization and Carbonization of Carbon Precursor

The polymerized carbon precursor is then carbonized in the mesopores. Carbonization of the carbon precursor is performed by heating the mesoporous silica containing the carbon precursor to a predetermined temperature in a non-oxidizing atmosphere (e.g., in an inert atmosphere or under vacuum). Specifically, the heating temperature is preferably 500° C. or more and 1200° C. or less. When the heating temperature is less than 500° C., the carbon precursor is not sufficiently carbonized. The heating temperature of higher than 1200° C. is not preferable because silica and carbon react with each other. The optimum heating time is selected according to the heating temperature.

The amount of carbon produced in the mesopores may be equal to or larger than such an amount that allows the carbon particles to maintain their shapes when the mesoporous silica is removed. Therefore, when the amount of carbon generated by performing filling, polymerization, and carbonization once is relatively small, it is preferable to repeat these steps a plurality of times. In this case, the conditions of each step that is repeated may be the same or different among the steps. When the steps of filling, polymerization, and carbonization are repeated a plurality of times, the carbonization treatment may be performed at a relatively low temperature in each carbonization step, and after the final carbonization treatment is ended, the carbonization treatment may be performed again at a higher temperature. When the final carbonization treatment is performed at a temperature higher than the temperatures of the previous carbonization treatments, the final carbonization treatment facilitates integration of carbon introduced into the pores over the plurality of times.

5.3. Third Step (Removal of Template)

Subsequently, the mesoporous silica serving as a template is removed from the composite (third step). Mesoporous carbon is thus obtained. Specific examples of the method for removing mesoporous silica include (1) a method in which the composite is heated in an alkaline aqueous solution such as sodium hydroxide, and (2) a method in which the composite is etched with an aqueous solution of hydrofluoric acid.

5.4. Fourth Step (Graphitization Treatment)

Thereafter, the mesoporous carbon is heat treated at a temperature higher than 1500° C., as necessary (fourth step). When a carbon source is carbonized in the mesopores of the mesoporous silica, the heat treatment temperature needs to be low in order to reduce the reaction between silica and the carbon. Therefore, the degree of graphitization of carbon after the carbonization treatment is low. In order to achieve a high degree of graphitization, it is preferable to heat treat the mesoporous carbon at a high temperature after removing the template.

When the heat treatment temperature is too low, graphitization is not enough. Therefore, the heat treatment temperature is preferably higher than 1500° C. The heat treatment temperature is more preferably 1700° C. or higher, even more preferably 1800° C. or higher. Performing the heat treatment at an unnecessarily high temperature is not useful as there is no difference in effects. Therefore, the heat treatment temperature is preferably 2300° C. or less. The heat treatment temperature is more preferably 2200° C. or less.

6. Functions

The size of the primary pores inside the mesoporous carbon is usually not uniform, and varies depending on the location. The size at the entrance of the primary pore is typically different from the size inside the primary pore. The size inside the primary pore is also not uniform, and the primary pore has constricted portions. Moreover, both the average of the sizes at the entrances of the primary pores (average entrance diameter) and the average of the sizes of the constrictions of the primary pores (average constriction diameter) affect the water retention of the mesoporous carbon under the high temperature and low humidity conditions.

Therefore, when mesoporous carbon in which the average entrance diameter and the average constriction diameter of primary pores are within predetermined ranges is used as a catalyst support for a fuel cell, water generated during power generation under the high temperature and low humidity conditions can be effectively retained in the primary pores. Since protons are transported to the surfaces of the catalyst particles by the generated water retained in the primary pores, the catalyst particles in the primary pores can be effectively used. As a result, the high temperature and low humidity performance of the fuel cell is improved.

Examples 1 to 6 and Comparative Example 1

1. Preparation of Samples
1.1. Preparation of Mesoporous Silica

1.1.1. Example 1

18 g of a surfactant, namely n-hexadecyltrimethylammonium chloride ($C_{16}H_{33}N(CH_3)_3Cl$), and 13 g of ethanol were added to 650 g of 1.5 mass % hydrochloric acid. 70 g of No. 1 sodium silicate (27 mass % of $SiO_2$, $SiO_2/Na_2O$=2.00) was also added while heating and stirring the mixture at 70° C. The resultant mixture was held for three hours to cause a polycondensation reaction. The solid product thus obtained was filtered out, and was dispersed in 1000 g of deionized water and stirred. The solid product was washed by repeating the filtering and the dispersion and stirring five times, and the washed solid product was dried at 70° C. for 24 hours. The dried sample was dispersed in 2N hydrochloric acid, and then heated in a sealed container at 100° C. for three days. After the resultant sample was filtered out, washed, and dried, the solid product was baked at 550° C. for six hours in the presence of air to obtain mesoporous silica. The peak diameter of the mesopores of the silica obtained by nitrogen adsorption measurement by the BJH method was 6.5 nm. The peak diameter of the macropores of the silica obtained by a mercury intrusion method was 0.20 μm.

1.1.2. Example 2

18 g of a surfactant, namely n-hexadecyltrimethylammonium chloride ($C_{16}H_{33}N(CH_3)_3Cl$), and 13 g of ethanol were added to 650 g of 1.5 mass % hydrochloric acid. 65 g of No. 1 sodium silicate (27 mass % of $SiO_2$, $SiO_2/Na_2O$=2.00) was also added while heating and stirring the mixture at 40° C. The resultant mixture was held for three hours to cause a polycondensation reaction. The solid product thus obtained was filtered out, and was dispersed in 1000 g of deionized water and stirred. The solid product was washed by repeating the filtering and the dispersion and stirring five times, and the washed solid product was dried at 70° C. for 24 hours. The dried sample was dispersed in 2N hydrochloric acid, and then heated in a sealed container at 100° C. for three days. After the resultant sample was filtered out, washed, and dried, the solid product was baked at 550° C. for six hours in the presence of air to obtain mesoporous silica. The peak diameter of the mesopores of the silica obtained by nitrogen adsorption measurement by the BJH method was 6.8 nm. The peak diameter of the macropores of the silica obtained by the mercury intrusion method was 0.25 μm.

1.1.3. Example 3

18 g of a surfactant, namely n-hexadecyltrimethylammonium chloride ($C_{16}H_{33}N(CH_3)_3Cl$), and 13 g of ethanol were added to 470 g of 2 mass % hydrochloric acid. 70 g of No. 1 sodium silicate (27 mass % of $SiO_2$, $SiO_2/Na_2O=2.00$) was also added while heating and stirring the mixture at 40° C. The resultant mixture was held for three hours to cause a polycondensation reaction. The solid product thus obtained was filtered out, and was dispersed in 1000 g of deionized water and stirred. The solid product was washed by repeating the filtering and the dispersion and stirring five times, and the washed solid product was dried at 70° C. for 24 hours. The dried sample was dispersed in 2N hydrochloric acid, and then heated in a sealed container at 100° C. for three days. After the resultant sample was filtered out, washed, and dried, the solid product was baked at 550° C. for six hours in the presence of air to obtain mesoporous silica. The peak diameter of the mesopores of the silica obtained by nitrogen adsorption measurement by the BJH method was 5.5 nm. The peak diameter of the macropores of the silica obtained by the mercury intrusion method was 0.23 μm.

1.1.4. Example 4

17 g of a surfactant, namely n-hexadecyltrimethylammonium chloride ($C_{16}H_{33}N(CH_3)_3Cl$), and 12 g of ethanol were added to 650 g of 1.5 mass % hydrochloric acid. 70 g of No. 1 sodium silicate (27 mass % of $SiO_2$, $SiO_2/Na_2O=2.00$) was also added while heating and stirring the mixture at 60° C. The resultant mixture was held for three hours to cause a polycondensation reaction. The solid product thus obtained was filtered out, and was dispersed in 1000 g of deionized water and stirred. The solid product was washed by repeating the filtering and the dispersion and stirring five times, and the washed solid product was dried at 70° C. for 24 hours. The dried sample was dispersed in 2N hydrochloric acid, and then heated in a sealed container at 100° C. for three days. After the resultant sample was filtered out, washed, and dried, the solid product was baked at 550° C. for six hours in the presence of air to obtain mesoporous silica. The peak diameter of the mesopores of the silica obtained by nitrogen adsorption measurement by the BJH method was 7.2 nm. The peak diameter of the macropores of the silica obtained by the mercury intrusion method was 0.26 μm.

1.1.5. Example 5

18 g of a surfactant, namely n-hexadecyltrimethylammonium chloride ($C_{16}H_{33}N(CH_3)_3Cl$), and 13 g of ethanol were added to 470 g of 2 mass % hydrochloric acid. 70 g of No. 1 sodium silicate (27 mass % of $SiO_2$, $SiO_2/Na_2O=2.00$) was also added while heating and stirring the mixture at 60° C. The resultant mixture was held for three hours to cause a polycondensation reaction. The solid product thus obtained was filtered out, and was dispersed in 1000 g of deionized water and stirred. The solid product was washed by repeating the filtering and the dispersion and stirring five times, and the washed solid product was dried at 70° C. for 24 hours. The dried sample was dispersed in 2N hydrochloric acid, and then heated in a sealed container at 100° C. for three days. After the resultant sample was filtered out, washed, and dried, the solid product was baked at 550° C. for six hours in the presence of air to obtain mesoporous silica. The peak diameter of the mesopores of the silica obtained by nitrogen adsorption measurement by the BJH method was 7.8 nm. The peak diameter of the macropores of the silica obtained by the mercury intrusion method was 0.25 μm.

1.1.6. Example 6

A predetermined amount of surfactant and 1N sodium hydroxide were added to a mixed solvent containing predetermined amounts of water, methanol, and ethylene glycol (EG) to obtain a first solution. Separately, a predetermined amount of tetraethoxysilane (TEOS) was added to a mixed solvent containing predetermined amounts of methanol and EG to obtain a second solution. Table 1 shows the amounts of the components of the solutions.

TABLE 1

|  |  | Example 6 |
|---|---|---|
| First Solution | Water (g) | 250 |
|  | Methanol (g) | 63 |
|  | EG (g) | 63 |
|  | Surfactant (g) | 7.2 |
|  | 1N NaOH (g) | 6.5 |
| Second Solution | TEOS (g) | 7.4 |
|  | Methanol (g) | 16 |
|  | EG (g) | 13 |

It was confirmed that, when the second solution was added to the first solution, the solution became cloudy after a while and the particles were able to be synthesized. After the mixture was stirred at room temperature for eight hours, filtering was performed, and the residue was re-dispersed in water. After filtering was performed again, the residue was dried in an oven at 45° C. The dried sample was dispersed in 2N sulfuric acid and then heated at 120° C. in an autoclave for three days. After heated in the autoclave, the sample was filtered and washed. Thereafter, the sample was baked at 550° C. for six hours to remove organic components. Mesoporous silica was thus obtained. The peak diameter of the mesopores of the silica obtained by nitrogen adsorption measurement by the BJH method was 5.2 nm. The peak diameter of the macropores of the silica obtained by the mercury intrusion method was 0.22 μm.

1.2. Preparation of Carbon Support

1.2.1. Examples 1 to 6

Mesoporous silica was placed in a container made of perfluoroalkoxyalkane (PFA), and furfuryl alcohol (FA) was added by an amount corresponding to the pore volume to cause the furfuryl alcohol (FA) to permeate the pores of the silica. FA was polymerized by performing a heat treatment at 150° C. for 18 hours. A heat treatment was further performed at 500° C. for six hours in a nitrogen atmosphere to promote carbonization of FA. This was repeated twice, and then a heat treatment was further performed at 900° C. for six hours in a nitrogen atmosphere to obtain a mesoporous silica-carbon composite. This composite was immersed in a 12% HF solution for 12 hours to dissolve the silica component in the HF solution. After the dissolution, filtering and washing were repeated, and drying was performed at 45° C. to obtain mesoporous carbon. The dried mesoporous carbon was heated at 1800° C. for one hour (graphitization treatment).

1.2.2. Comparative Example 1

Commercially available hollow (mesoporous) carbon (Comparative Example 1) was used as it is as a carbon support.

1.3. Production of Fuel Cell

Pt was supported on the carbon support obtained as described above. The amount of Pt supported on the carbon support was 40 mass %. An air electrode catalyst layer was prepared by using this. The basis weight of Pt on the air electrode side was 0.15 mg/cm². The I/C of the air electrode catalyst layer was 1.0. A fuel electrode catalyst layer was prepared using commercially available platinum-supported carbon supporting 30 mass % of Pt. The basis weight of Pt on the fuel electrode side was 0.1 mg/cm². The I/C of the fuel electrode catalyst layer was 0.75. A fluorine solid polymer electrolyte was used as a catalyst layer ionomer for both the air electrode catalyst layer and the fuel electrode catalyst layer.

The air electrode catalyst layer and the fuel electrode catalyst layer were transferred to both surfaces of an electrolyte membrane to obtain an MEA. A fluorine solid polymer electrolyte membrane was used as the electrolyte membrane. The MEA was attached to a 1 cm² square cell. A diffusion layer and a current collector were placed on both sides of the MEA. Carbon paper with a microporous layer was used as the diffusion layer. A gold-plated copper plate with integrated flow channels (flow channels: straight flow channels with a pitch of 0.4 mm) was used as the current collector.

2. Test Method 2.1. Three-Dimensional Transmission Electron Microscope Observation Each carbon support was observed with a three-dimensional transmission electron microscope (3DTEM). The average entrance diameter and the average constriction diameter of the primary pores were calculated using the obtained 3DTEM images.

2.2. Average Pore Diameter

A nitrogen adsorption isotherm was measured for each carbon support. The pore size when the pore volume was maximized (most frequent peak value) was obtained by analyzing the adsorption data of the nitrogen adsorption isotherm by the BJH method.

2.3. High Temperature and Low Humidity Voltage

The high temperature and low humidity voltage was obtained by the following procedure. A power generation test was performed by heating and holding the power 2.4. Efficiency Point Voltage The "efficiency point voltage" refers to the voltage at a current density of 0.2 A/cm², as measured under the following conditions: cell temperature: 80° C., and relative humidity: 30%. The efficiency point voltage was obtained by the following procedure. A power generation test was performed by holding the power generation cell composed of the MEA, the diffusion layers, and the flow channels at 80° C., supplying humidified air to the air electrode, and supplying humidified hydrogen to the hydrogen electrode. The air electrode stoichiometry was 1.25, and the hydrogen electrode stoichiometry was 1.5. The relative humidity of the air electrode and the hydrogen electrode was 30%.

3. Results 3.1. Three-Dimensional Transmission Electron Microscope Observation

Figure 1B:
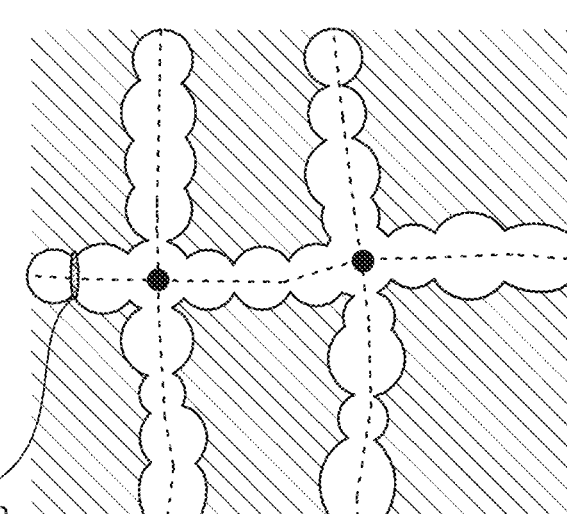
FIG. 1B is a schematic diagram of the pore structure of the mesoporous carbon obtained in Example 1.
Figure 2A:
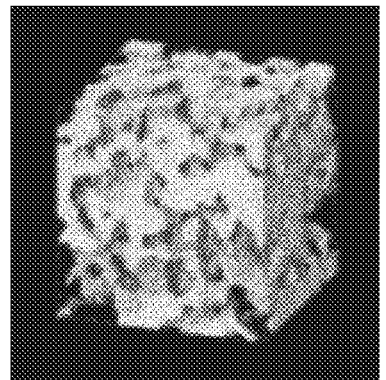
FIG. 2A is a three-dimensional image of mesoporous carbon obtained in Comparative Example 1.
Figure 2B:
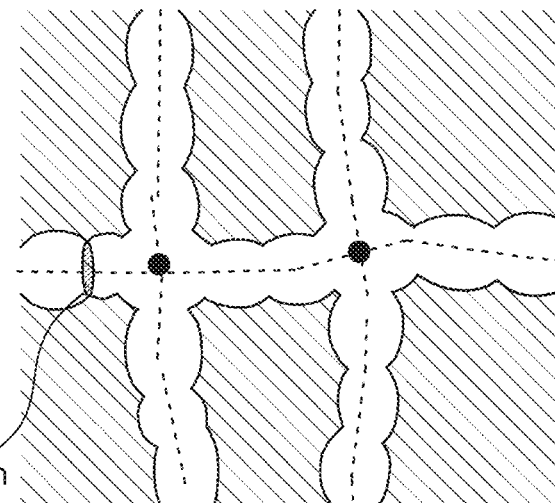
FIG. 2B is a schematic diagram of the pore structure of the mesoporous carbon obtained in Comparative Example 1.

FIG. 1A is a three-dimensional image of the mesoporous carbon obtained in Example 1. FIG. 1B is a schematic diagram of the pore structure of the mesoporous carbon obtained in Example 1. FIG. 2A is a three-dimensional image of the mesoporous carbon obtained in Comparative Example 1. FIG. 2B is a schematic diagram of the pore structure of the mesoporous carbon obtained in Comparative Example 1. It can be seen from FIGS. 1A to 2B that the pores inside the carbon support are not uniform in size, and have a large number of constrictions. It can also be seen from the figures that the constrictions are also not uniform in size, and the size of the constrictions varies depending on the location.

3.2. Pore Size and Power Generation Performance

Figure 3:
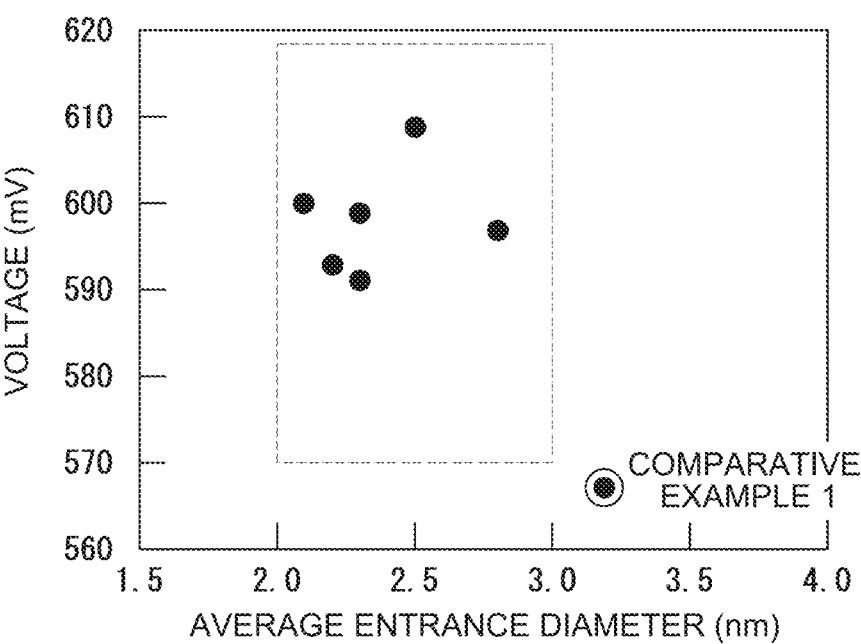
FIG. 3 is a graph showing the relationship between the average entrance diameter and the high temperature and low humidity voltage.
Figure 4:
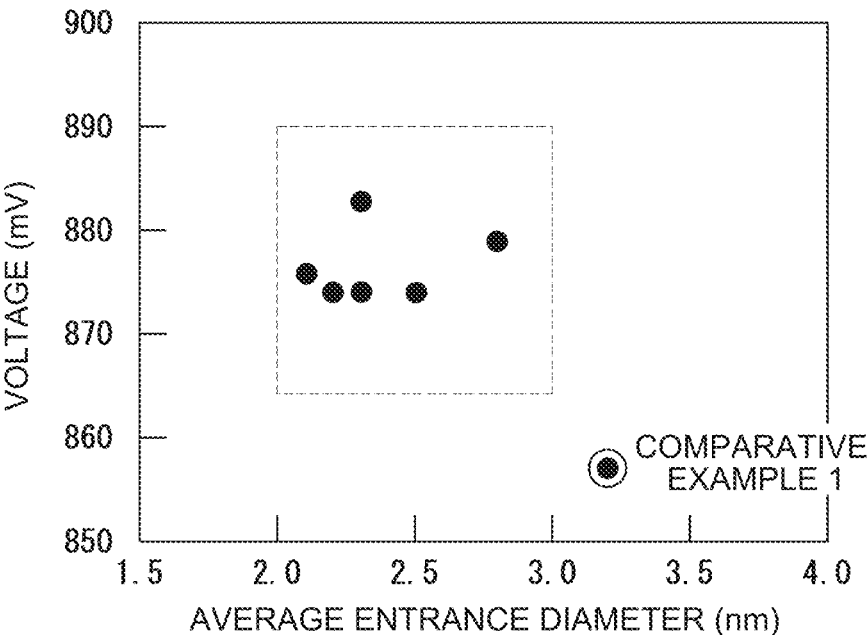
FIG. 4 is a graph showing the relationship between the average entrance diameter and the efficiency point voltage.
Figure 5:
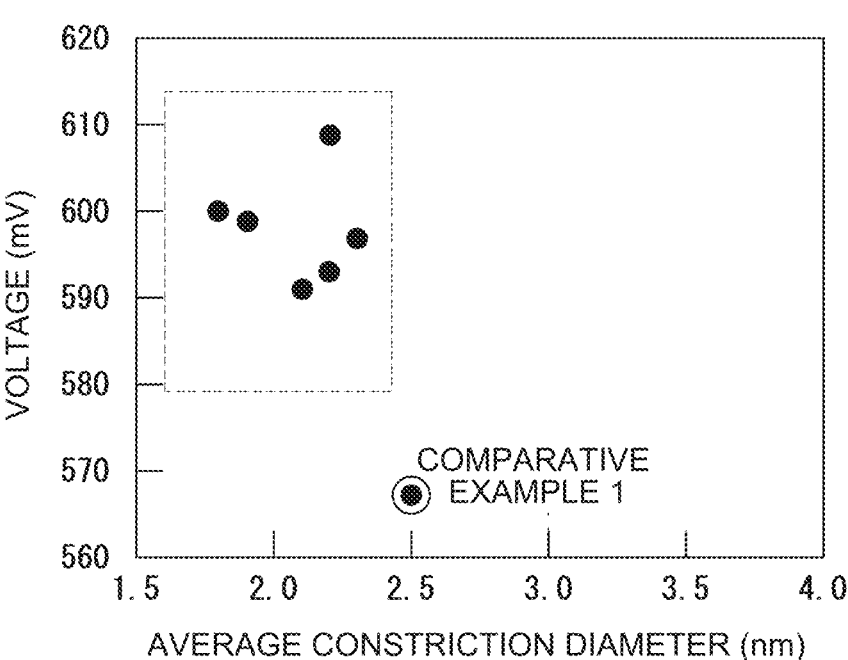
FIG. 5 is a graph showing the relationship between the average constriction diameter and the high temperature and low humidity voltage.
Figure 6:
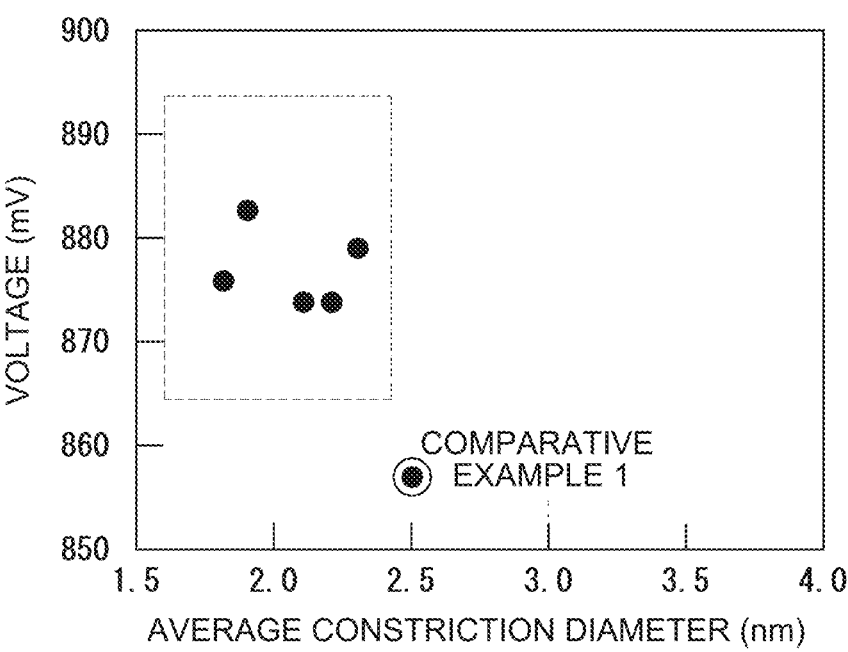
FIG. 6 is a graph showing the relationship between the average constriction diameter and the efficiency point voltage.

Table 2 shows the average entrance diameter, average constriction diameter, and average pore diameter of each carbon support, and the high temperature and low humidity voltage and efficiency point voltage of each polymer electrolyte fuel cell. FIG. 3 shows the relationship between the average entrance diameter and the high temperature and low humidity voltage. FIG. 4 shows the relationship between the average entrance diameter and the efficiency point voltage. FIG. 5 shows the relationship between the average constriction diameter and the high temperature and low humidity voltage. FIG. 6 shows the relationship between the average constriction diameter and the efficiency point voltage. The following can be seen from Table 2 and FIGS. 3 to 6.

TABLE 2

| | Average Entrance Diameter (nm) | Average Constriction Diameter (nm) | Average Pore Diameter* (nm) | High Temperature and Low Humidity Voltage (mV) | Efficiency Point Voltage @ 0.2 A/cm² Low Humidity-IV (mV) |
|---|---|---|---|---|---|
| Example 1 | 2.5 | 2.2 | 2.7 | 609 | 874 |
| Example 2 | 2.3 | 2.1 | 3.4 | 591 | 874 |
| Example 3 | 2.3 | 1.9 | 2.4 | 599 | 883 |
| Example 4 | 2.2 | 2.2 | 3.4 | 593 | 874 |
| Example 5 | 2.8 | 2.3 | 3.4 | 597 | 879 |
| Example 6 | 2.1 | 1.8 | 2.4 | 600 | 876 |
| Comparative Example 1 | 3.2 | 2.5 | 2.6 | 567 | 857 |

*BJH method (nitrogen adsorption isotherm)

generation cell composed of the MEA, the diffusion layers, and the flow channels at 105° C., supplying humidified air to the air electrode, and supplying humidified hydrogen to the hydrogen electrode. The air electrode stoichiometry was 1.25, and the hydrogen electrode stoichiometry was 1.5. The relative humidity of the air electrode and the hydrogen electrode was 30%.

(1) Comparative Example 1 is a material equivalent to the material described in WO 2016/152447. In Comparative Example 1, the high temperature and low humidity voltage is low. This is considered to be because the generated water is less likely to be retained in the primary pores under the high temperature and low humidity conditions as the average entrance diameter is larger than 3.0 nm and the average constriction diameter is larger than 2.4 nm. (2) In each of Examples 1 to 6, the high temperature and low humidity voltage is high. This is considered to be because the average entrance diameter and the average constriction diameter are within appropriate ranges.

(3) Comparative Example 1 has a low efficiency point voltage. This is considered to be because the water generated during power generation is less likely to be retained due to the large entrance and constriction diameters. (4) Each of Examples 1 to 6 has a high efficiency point voltage. This is considered to be because the water generated during power generation is likely to be retained as the entrance diameter and the constriction diameter are small.

Although the embodiment of the present disclosure is described in detail above, the present disclosure is not limited to the above embodiment, and various modifications can be made without departing from scope of the present disclosure.

The mesoporous carbon according to the present disclosure can be used as a catalyst support for an air electrode catalyst layer or a catalyst support for a fuel electrode catalyst layer of a polymer electrolyte fuel cell.

What is claimed is:

1. Mesoporous carbon comprising:
a linked structure in which carbon particles are linked, wherein
the carbon particles have primary pores and are primary particles,
an average entrance diameter of the primary pores is 2.0 nm or more and 3.0 nm or less, and
an average constriction diameter of the primary pores is 1.6 nm or more and 2.4 nm or less, the average entrance diameter being an average of circle equivalent diameters at entrances of the primary pores that are open to surfaces of the carbon particles, as measured by three-dimensional transmission electron microscope image analysis, and the average constriction diameter being an average of circle equivalent diameters of constrictions of the primary pores inside the carbon particles, as measured by the three-dimensional transmission electron microscope image analysis;
wherein the mesoporous carbon exhibits a high temperature and low humidity voltage of 570 mV or more.

2. The mesoporous carbon according to claim 1, wherein an average particle size of the carbon particles is 30 nm or more and 300 nm or less.

3. An electrode catalyst for a fuel cell, the electrode catalyst comprising:
the mesoporous carbon according to claim 1; and
catalyst particles supported in the primary pores of the mesoporous carbon.

4. A catalyst layer comprising:
the electrode catalyst according to claim 3; and
a catalyst layer ionomer.

* * * * *